Dec. 2, 1969 A. W. VINAL 3,482,222

ELECTRICAL SWITCHING APPARATUS

Filed July 6, 1964 2 Sheets-Sheet 1

INVENTOR
ALBERT W. VINAL
BY George J. Netter
ATTORNEY

United States Patent Office 3,482,222

Patented Dec. 2, 1969

3,482,222

ELECTRICAL SWITCHING APPARATUS

Albert W. Vinal, Owego, N.Y., assignor to International Business Machines Corporation, New York, N.Y., a corporation of New York Filed July 6, 1964, Ser. No. 380,261
Int. Cl. H03k 17/60
U.S. Cl. 340—174 6 Claims

ABSTRACT OF THE DISCLOSURE

A circuit having a pair of back-to-back matched gating transistors which provides an electrical signal between the emitters indicative of the coincidental presence of an input signal which is applied to the collectors and the actuation of a selective gating signal which is applied to the bases, the gating signal when applied driving the transistors into simultaneous saturation; and a readout system for a magnetic memory system employing such a circuit.

The invention described herein is made in the performance of work under a NASA contract and is subject to the provisions of Section 305 of the National Aeronautics and Space Act of 1958, Public Law 85–568 (72 Stat. 426; 42 U.S.C. 2451), as amended.

The present invention relates generally to electrical switching apparatus, and more particularly to such apparatus for use in a multiplex sampling switch capacity.

An important design selection criterion in data processing systems incorporating a memory is the access time necessary to transfer information out of storage in the memory apparatus to the remainder of the data processing system, or to peripheral equipment. And, it is one of the primary enhanced accomplishments of this invention to improve such access time.

The memory function in present day electronic data handling equipment is usually achieved by magnetic storage techniques, a frequently encountered form of which includes a large number of magnetic elements having coincident X and Y addressing means for setting the different elements to different magnetic states representative of corresponding binary states. The magnetic elements, or cores, are arranged in planes and the planes can be stacked to form three-dimensional arrays. Conventionally, the cores forming each plane are threaded with a sense winding for read-out which is accomplished by a similar coincident addressing technique with sense (read-out) signals being provided on a plane-by-plane basis. It is specifically in connection with the read-out of sense windings of a magnetic core memory that the present invention is believed to have its greatest utility.

Futher, although the special switching apparatus set forth herein can be adapted for utilization with magnetic memory equipment of great variety, it is especially, and most immediately, applicable to memories constructed of NDRO (non-destructive read-out) elements. The term refers to that type of magnetic element that can be read-out without destroying the magnetic state in which the element exists at the time of read-out. This capability is possessed by so-called transfluxor cores, and the multi-apertured device set forth in co-pending United States patent application Ser. No. 205,769 filed June 27, 1962 and now U.S. Patent No. 3,231,876, Electrical Switching Means, by Albert W. Vinal, assigned to the same assignee, is an excellent example.

One well-known scheme for handling the different signals from the different planes is to perform synchronized transference via a transformer means having a sufficient number of primary windings to individually accommodate the sense windings, and a single secondary winding to serve as an output distribution means. A construction of this general character is disclosed in the above-mentioned co-pending U.S. patent application.

The use of transformers in this capacity, such as described in the co-pending application, provides a somewhat longer access time than it would be desirable to have. Also, transformers have an inherent tendency to attenuate the sense signals to a significant degree, which is also undesirable.

It is therefore a primary object of the invention to provide new and improved electrical switching apparatus having a plurality of individual input connectors and a single output channel.

It is another object of the invention to provide electrical switching apparatus not relying upon inductive components.

A still further object is the provision in electrical switching apparatus of a multiplex sampling circuit possessing inherently high speed of operation and information transference.

Another object is the provision of switching apparatus having a high degree of common mode rejection of noise with minimum power requirements.

Yet another object is the provision of a high speed differential sampling circuit substantially devoid of differtial gate noise during operation.

A further object of the invention is the provision of electrical switching apparatus which is relatively simple in construction, inexpensive and readily adaptable to high volume production.

Briefly, the apparatus set forth below comprises a plurality of special sampling circuits, each of which is fed by a different sense winding. The outputs of the sampling circuits are collectively presented to a differential amplifier that has a single set of output terminal means. The special sampling circuit includes a pair of transistors interconnected in particular configuration such that when a gating pulse is applied to the circuit the transistors are substantially simultaneously driven to saturation thereby enabling selected, or sampled, sense signals to be presented to the differential amplifier incoming terminal means.

The foregoing and other objects, features and advantages of the invention will be apparent from the following more particular description of a preferred embodiment of the invention, as illustrated in the accompanying drawings.

Figure 1:
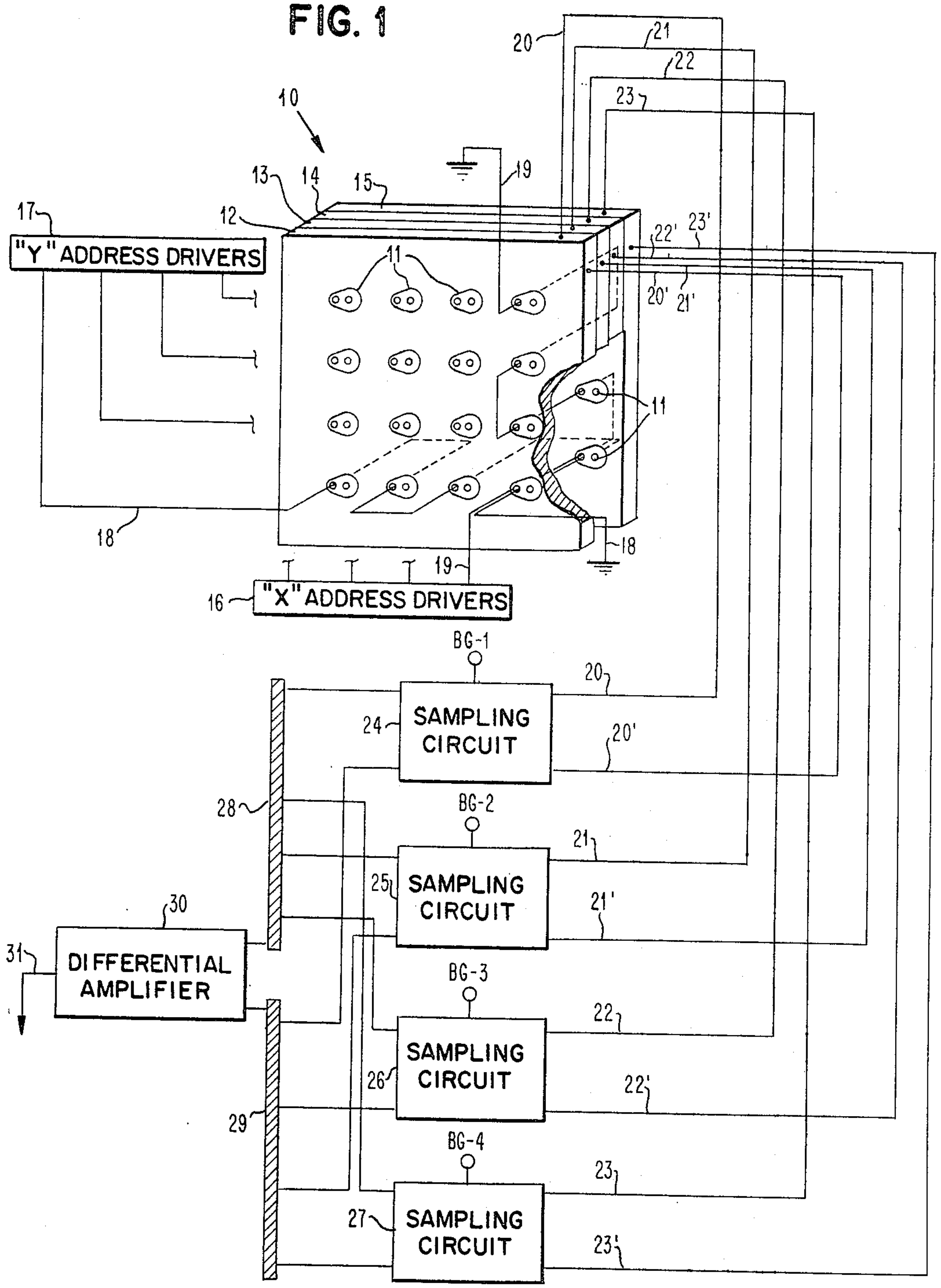
FIGURE 1 shows a three-dimensional magnetic memory system in stylized block diagram form, and illustrating the general overall relationship of the system to the special switching apparatus of the invention.

Reference should now be made particularly to FIGURE 1 illustrating the novel multiplex sampling circuit in its overall relation to a three-dimensional core storage matrix, or memory, 10. In the main, the memory consists of a plurality of magnetic storage elements 11 arranged in a matrix of planes 12–15, where each plane is composed of elements laid out in mutually orthogonal rows and columns. For utilizing the present invention to achieve serial read-out, the magnetic elements 11 must possess non-destructive read-out properties and the multiapertured device illustrated in such a device. In a way that is more fully set forth in the above-noted co-pending patent application, X and Y address drivers 16 and 17, respectively, are selectively actuatable to provide electric current to windings inductively associated with the different magnetic storage elements for effecting storage and read-out.

Further on this point, each element of each row of each plane is provided with a separate Y address winding (e.g., winding 18), and similarly each element of each column of each plane is magnetically linked by separate address windings (e.g., winding 19). Exemplary of customary addressing operation, coincident energization of the windings 18 and 19 would set each element in the lower right hand corner to the "one" condition, and by means not shown, those planes which are not desired to be written into would be inhibited resulting in a "one" being stored in the element of the lower right hand corner of each selected, i.e. uninhibited, one of the planes 12–15.

As indicated earlier each of the planes 12–15 is conventionally provided with an individual sense winding that links all of the elements of the associated plane. Although sense windings are threaded through the different elements of the plane in a special manner to cancel out so-called half-select noise, for example, no details are given in this connection here since they are well-known expedients in the core memory art and not specifically germane to present purposes. Accordingly, merely the external leads of the sense windings are shown, that is, sense winding 20 for plane 12, winding 21 for plane 13, winding 22 for plane 14, and winding 23 for plane 15. Primed reference numerals are used to indicate the second terminal of the corresponding sense windings.

In read-out, the appropriate X and Y address lines are coincidently energized. It is fundamental here that if a "zero" resides at the addressed location, no signal is forthcoming at the sense windings; however, if a "one" is stored at an addressed element, switching of the core induces a significant signal into the associated sense winding. The general configuration of FIGURE 1 provides serial read-out, that is, each plane has a separate sense winding that is fed into individual sense signal handling means with appropriate gating control effecting serial read-out.

The pairs of leads from the sense windings 20–20′, 21–21′, and so forth, are fed into corresponding sampling circuits 24–27, the detailed features and connective aspects of which will be gone into later below. Operation of the sampling circuits is placed under the control of and synchronized by bit gate signals BG1–BG4, which for present purposes can be square-wave voltage pulses provided in a predetermined timing arrangement. Information from the various sampling circuits is connected to bus bars 28 and 29 which, in turn, are connected to the input terminals of a differential amplifier 30 having a single output 31. It is the purpose of the differential amplifier to raise the level of the sampled sense signals to a value that is readily utilizable for further handling by the other sections of a computer, for example, or by peripheral equipment. A primary reason for the use of a differential amplifier over direct amplitude amplifying is that so-called common mode noise caused by winding capacitance in the memory is usually many times the magnitude of the "one" sense signal, and accordingly must be taken into account or eliminated during read-out of the sense signals. In function achieved the differential amplifier 30 acts as a single output channel for the binary digital information stored in the storage matrix 10 and read-out through coincident addressing. Or considered from a slightly different standpoint, since only one sense winding is addressed at a time, the information at the output of the differential amplifiier is a serialized version of the stored information.

Figures 2, 3:
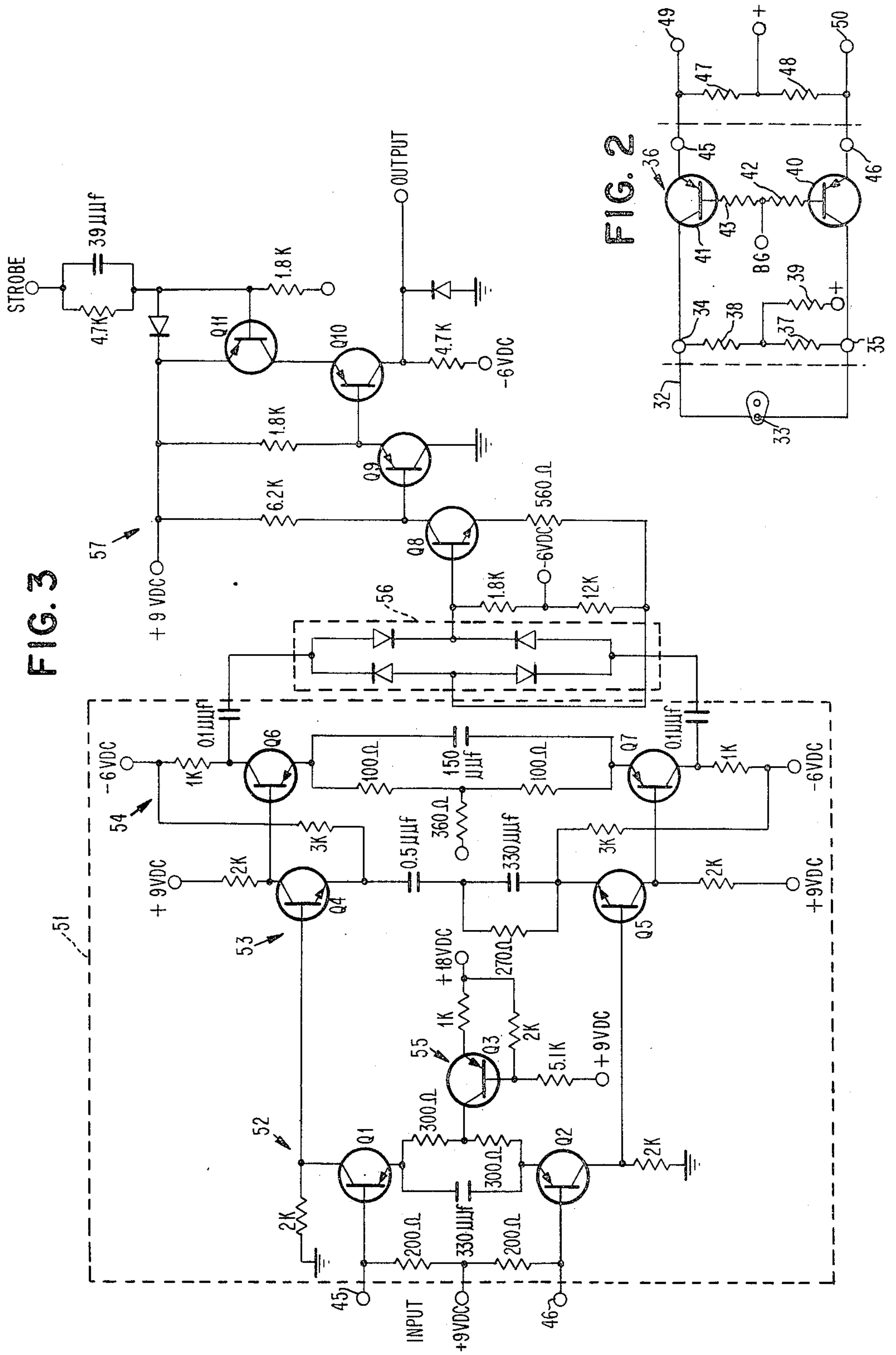
FIGURE 2 is a circuital representation of the sampling circuit in accordance with the invention shown in operative relation to a sense winding of a core memory.
FIGURE 3 is a circuit schematic of a differential amplifier particularly advantageous for use with the sampling circuit of FIGURE 2.

With attention directed primarily to FIGURE 2, there is shown a circuit schematic of the sampling circuit that is of fundamental importance to the invention. The winding 32 and multiapertured core 33 represent in stylized form any sense winding and its associated magnetic memory elements of the memory 10. Terminals 34 and

35 serve as an input means to the sampling circuit that is identified in its entirety as at 36, and corresponds to that portion of the circuit lying between the two dashed lines. A pair of sense terminating resistances 37 and 38 of equal value are serially arranged between the terminals 34 and 35 forming a resistance shunt to the incoming sense signals. Positive DC bias is applied to the common electrical point of the resistances 37 and 38 via a scaling resistance 39. The collectors of a pair of PNP transistors 40 and 41 are respectively interconnected with terminals 34 and 35. A pair of identically valued resistances 42 and 43 in serial connection relate the bases of the two transistors to one another. The common point of the resistances 42 and 43 acts as a terminal to which bit gate control voltages (BG) are applied. The two emitters are fed into respective output terminals 45 and 46.

The illustrated circuit, however, requires that a succeeding circuit to which it is connected (differential amplifier 30) have a resistance input. Accordingly, the sampling circuit is illustrated alternatively as having a serial resistance path, comprising resistances 47 and 48, disposed in parallel across the emitters of the transistors. In a multiplexing arrangement as being considered here, where there are a plurality of such sampling circuits feeding into a single differential amplifier, it is the more feasible approach from a component standpoint to include a single set of resistances 47 and 48 in the differential amplifier circuit itself, rather than provide a separate set for each sampling circuit. Thus, as shown in FIGURE 2, the midpoint connection or junction of the resistances 47 and 48 are connected to a bias or reference source, not shown, via the terminal illustrated thereat similar to the manner in which the midpoint connection or junction of the series-connected 200 ohm resistances, which are shunted across the terminals 45 and 46 of FIGURE 3, are connected to a terminal to which is applied the voltage +9VDC illustrated thereat. In practice, the voltage applied to the terminal connected to the midpoint of resistances 47 and 48 is sufficient to maintain the transistors 40 and 41 cut-off in the absence of a gating signal BG, or to maintain the circuit in a balanced condition in the presence of a gating signal BG and the absence of a current signal applied to the input terminals 34, 35 as will be explained in greater detail hereinafter. For example, this may be accomplished, as is well known to those skilled in the art, by maintaining the terminal connected to resistance 39 and the terminal connected to the junction of resistances 47, 48 at the same potential and polarity, e.g., positive for the particular PNP transistor types shown in FIG. 2. Preferably, the collectors of the PNP transistors are maintained at a positive potential relative to their respective emitters.

In operation, the collectors of the transistors are maintained at a positive potential relative to their respective emitters via scaling resistance 39 and resistances 37 and 38. Gating potential applied to the bases of the transistors induces saturation in both substantially simultaneously establishing a low impedance path across their collector-emitter junctions. With no signal present at the input terminals 34 and 35, there is a balanced circuit condition and substantially zero potential difference exists across the terminals 45 and 46 (or terminals 49 and 50) an no differential current is passed through resistances 47 and 48. It is to be understood, however, and as is apparent to those skilled in the art, that when the gating signal BG is applied, an other current which is derived from the source, not shown, connected to the terminal associated with the midpoint of the junction of resistances 47 and 48, divides equally into two branches associated with two symmetrical circuit paths. Each path is comprised mainly of one of the resistances 47, 48, the emitter-base impedance of a particular transistor 40, 41, the respective emitter of which is directly connected to the particular resistance 47, 48 of the path, and the particular one of the resistances 42, 43 which is connected to the base of the particular transistor. These circuit paths are connected commonly at the midpoint of the resistances 42, 43 and consequently the branch currents are reunited thereat. From there, the current is returned through the gating signal source, not shown, via a common circuit ground, not shown, to the source, not shown, which is connected to the midpoint of the resistances 47, 48. Due to the symmetry of the circuit, these branch currents which pass through the respective resistances 47, 48 are equal in amplitude and direction. Consequently, the potentials at each of the emitters or terminals 45, 46 are of equal amplitude and of the same polarity resulting in the aforementioned zero potential difference. In the absence of a signal at inputs 34, 35, as aforementioned, zero or no differential current is passed through the resistances 47, 48. As a read-out pulse is applied to the appropriate address lines, a corresponding induced current is obtained in the sense winding 32 if a "one" exists at the addressed memory location causing unbalanced current to flow in resistances 37 and 38. Since the transistors are both in saturation due to the presence of the gating pulse (BG), differential current now flows across the emitter-collector junctions of the transistors and through the resistances 47 and 48 in a direction corresponding to the polarity of the induced sense signal. In the case of a "zero" being stored at that location, a similar signal is obtained, however, the amplitude of this signal is considerably less than for a "one" permitting easy discrimination between the two. In either case, when the input signal is applied to the input terminals 34, 35, the differential current is passed through the series-connected resistances 47, 48 in a direction which depends on the polarity of the input signal and is superimposed with their respective aforedescribed branch currents. As is apparent to those skilled in the art, the direction of this differential current is the same as the direction of one of the branch currents that is simultaneously passing through one of the resistances 47, 48 and opposite to the direction of the other branch current that is simultaneously passing through the other one of resistances 47, 48. The net effect is to generate an output signal that is indicative of the presence of and proportional to the amplitude and polarity of the input signal being sampled.

In either case the potential difference obtained at terminals 49 and 50 is presented to the busses 28 and 29, and thence to the differential amplifier 30.

Although not intended to confine practice of the invention to a specific set of parameter values, a sampling circuit constructed of the following components in the manner described above is fully satisfactory for accomplishing the objects and purposes of the present invention:

| | |
|---|---|
| Resistances **37** and **38** | 100 ohms. |
| Resistances **42** and **43** | 13,000 ohms. |
| Resistances **47** and **48** | 200 ohms. |
| Transistors **40** and **41** | Matched silicon PNP transistors manufactured by Texas Instruments, Inc. under the designation B–314. |

A satisfactory differential amplifier for present purposes may be provided by a number of different circuit arrangements, one such circuit that has been found to be especially effective here is that shown in FIGURE 3. Incoming signals from the busses 28 and 29 are presented to terminals 45 and 46 which assumes that the resistances 47 and 48 are included within the amplifier rather than having a set of these resistances in each sampling circuit. The amplifier comprises in its major aspects a first amplifying section 51 including three push-pull amplifiers 52–54 and a constant current source 55. The amplified output of the section 51 is then fed via an impedance isolation switch 56 to a high-gain, Class A, single-ended amplifier 57. The basic differential amplifier function is accomplished by the means 51, the parameter and bias voltage values being as shown when used with the following transistors:

| | |
|---|---|
| Q1 and Q2 | Silicon PNP, Catalog No. SM–2426, manufactured by Texas Instruments, Inc. |
| Q3, Q6 and Q7 | Silicon PNP, Catalog No. S–440, manufactured by Fairchild Semiconductor Corporation. |
| Q4 and Q5 | Silicon NPN, Catalog No. S–4318, manufactured by Fairchild Semiconductor Corporation. |

A read-out system for a magnetic memory constructed in accordance with the principles set forth herein is inherently fast operating and provides excellent rejection of common mode noise signals. A further and important advantage results from the manner in which the sampling circuit operates, namely, exceptionally low gate noise. That is, the combined effect of isolation of the sense signal from the output of the sampling circuit as well as push-pull transistor configuration produce very small gate noise.

While the invention has been particularly described with reference to a preferred embodiment thereof, it will be understood by those skilled in the art that various changes in form and details may be made therein without departing from the spirit and scope of the invention.

What is claimed is:

1. A switching circuit for receiving a current signal and selectively providing a potential difference across a pair of output terminals representative thereof, comprising:

a pair of active first and second semiconductor means, each of said semiconductor means having first, second and third electrodes, each of the first electrodes being bistable to promote current conductivity between its associated respective second and third electrodes;

first and second same value resistances arranged in a series first path between the second electrodes of the semiconductor means, the respective points of connection of the first and second resistances to the respective second electrodes serving as input terminals for the switching circuit;

a bias voltage source;

a third resistance interconnecting the common point of said first and second resistances to said bias voltage source;

fourth and fifth resistances of same value arranged in a series second path interconnecting the first electrodes of the semiconductor means;

selectively actuatable control voltage means connected to the common point of said fourth and fifth resistances for selectively promoting current conductivity along the path including the second and third electrodes of said first semiconductor means and the path including the second and third electrodes of said second semiconductor means; and an output resistance network arranged across the third electrodes, the respective points of connection of the resistance network to the respective third electrodes serving as said output terminals for the circuit where by coincidence of actuation of the control voltage means and current applied to the input terminals produces an output potential difference across the output terminals.

2. A sampling circuit for controllably providing an electric signal indication on the presence of a current signal at the input, comprising:

a pair of matched transistors, each having a base, collector and emitter;

a first resistance network serving as an input for the circuit to receive the current signal and relate it to the collectors of the transistors;

a selectively actuatable source of bias voltage connected to the bases of the transistors, actuation of which places the transistors in substantially simultaneous saturation producing a low impedance collector-emitter path therein;

the emitters of the transistors defining output means across which the electric signal is generated upon coincidence of actuation of the bias voltage source and the presence of a current signal at the circuit input.

3. A sampling circuit as in claim 2, wherein said output means further comprises a second resistance network interrelating the emitters of the transistors in a shunting relationship, said emitters further defining the output terminals of the circuit.

4. A sampling circuit as in claim 2, in which the first resistance network includes a pair of resistances of substantially the same value arranged in series with the current signal, and further characterized by connection means for relating the two collectors via said first resistance network.

5. A sampling circuit for effecting read-out from the sense winding of a magnetic core memory, comprising:

first and second transistors, each having a base, collector and emitter;

a first resistance circuit closing the sense winding;

connecting means relating each point of connection between the resistance circuit and the sense winding to a mutually exclusive one of the collectors of the transistors;

bit gate control means for effecting synchronized simultaneous biasing of the bases to place the transistors in saturation;

a second resistance network serially connected across the emitters of the transistors; and differential amplifying means connected in shunt with the second resistance network for amplifying the potential difference existing across said resistance network upon biasing by the bit gate control means and receipt of a signal via the sense winding at the same time.

6. A sampling system for providing single channel read-out of a magnetic core memory having a plurality of non-destructive read-out cores arranged in a plurality of planes, each plane having individual sense winding means, comprising:

a plurality of sampling circuits, each sense winding being coupled to an individual one of the sampling circuits, each of said sampling circuits including a pair of transistors, each transistor having a base, collector and emitter, each of said sampling circuits further including a resistance network coupling the sense winding associated therewith to the collectors of the pair of transistors of the particular sampling circuit, a source of bias control voltage, means connecting the source to the bases of said pair of transistors of said particular circuit for selectively placing the transistors of said particular circuit in the conductive state, and terminal means associated with the emitters of the particular circuit to serve as an output;

a differential amplifier having an input and a single channel output; and multiplexing connection means relating the outputs of the sampling circuits to the input of the differential amplifier.

References Cited

UNITED STATES PATENTS

| | | | |
|---|---|---|---|
| 3,022,454 | 2/1962 | Millis | 307—88.5 X |
| 3,242,443 | 3/1966 | Massaro | 307—88.5 X |
| 3,330,969 | 7/1967 | Loyen | 307—88.5 |

JAMES W. MOFFITT, Primary Examiner

U.S. Cl. X.R.

307—254; 330—30